United States Patent [19]
Chow et al.

[11] Patent Number: 6,128,775
[45] Date of Patent: Oct. 3, 2000

[54] METHOD, SYSTEM, AND COMPUTER PROGRAM PRODUCT FOR PERFORMING REGISTER PROMOTION VIA LOAD AND STORE PLACEMENT OPTIMIZATION WITHIN AN OPTIMIZING COMPILER

[75] Inventors: Frederick Chow, Fremont; Robert Kennedy, Boulder Creek; Shin-Ming Liu, Saratoga; Raymond Lo, Sunnyvale; Peng Tu, Union City; Sun C. Chan, Fremont, all of Calif.

[73] Assignee: Silicon Graphics, Incorporated, Mountain View, Calif.

[21] Appl. No.: 09/097,713

[22] Filed: Jun. 16, 1998

[51] Int. Cl.$^7$ .................................................. G06F 9/45
[52] U.S. Cl. ........................................................ 717/9
[58] Field of Search .................................. 395/709; 717/9

[56] References Cited

U.S. PATENT DOCUMENTS

| | | | |
|---|---|---|---|
| 5,327,561 | 7/1994 | Choi et al. | 395/709 |
| 5,659,754 | 8/1997 | Grove et al. | 395/709 |
| 5,768,596 | 6/1998 | Chow et al. | 395/709 |

OTHER PUBLICATIONS

Rosen et al. Global Value Numbers and Redundant Computations. ACM. pp. 12–27, Jan. 1988.

Gupta. Code Optimization as a Side Effect of Instruction Scheduling. High Performance Computing, Dec. 1997. Proceedings. Fourth International Conference. pp. 370–377.

Chow et al., "A New Algorithm for Partial Redundancy Elimination based on SSA Form", *Proceedings of the ACM SIGPLAN '97 Conference on Programming Language Design and Implementation*, pp. 273–286, Jun. 1997.

Chow et al., "Effective Representation of Aliases and Indirect Memory Operations in SSA Form", *Proceedings of the Sixth International Conference on Compiler Construction*, pp. 253–267, Apr. 1996.

Chow, F. and J. Hennessy, "The Priority–Based Coloring Approach to Register Allocation", *ACM Transactions on Programming Language and Systems*, vol. 12, No. 4, pp. 501–536, Oct. 1990.

Cooper, K. and J. Lu, "Register Promotion in C Programs", *Proceedings of the ACM SIGPLAN '97 Conference on Programming Language Design and Implementation*, pp. 308–319, Jun. 1997.

(List continued on next page.)

*Primary Examiner*—Tariq R. Hafiz
*Assistant Examiner*—Wei Zhen
*Attorney, Agent, or Firm*—Sterne, Kessler, Goldstein & Fox P.L.L.C.

[57] ABSTRACT

A method, system, and computer program product for performing register promotion, that optimizes placement of load and store operations of a computer program within a compiler. Based on the observation that the circumstances for promoting a memory location's value to register coincide with situations where the program exhibits partial redundancy between accesses to the memory location, the system is an approach to register promotion that models the optimization as two separate problems: (1) the partial redundancy elimination (PRE) of loads and (2) the PRE of stores. Both of these problems are solved through a sparse approach to PRE. The static single assignment PRE (SSAPRE) method for eliminating partial redundancy using a sparse SSA representation representations the foundation in eliminating redundancy among memory accesses, enabling the achievement of both computational and live range optimality in register promotion results. A static single use (SSU) representation is defined allowing the dual of the SSAPRE algorithm, called SSUPRE, to perform the partial redundancy elimination of stores. SSUPRE is performed after the PRE of loads, taking advantage of the loads' having been converted into pseudo-register references so that there are fewer barriers to the movement of stores. Consequently, the compiler produces more efficient, register-promoted executable program code from the SSA representation.

8 Claims, 6 Drawing Sheets

OTHER PUBLICATIONS

Dhamdhere, D., "Register Assignment Using Code Placement Techniques", *Journal of Computer Languages*, vol. 13, No. 2, pp. 75–93, 1988.

Dhamdhere, D., "A Usually Linear Algorithm For Register Assignment Using Edge Placement of Load and Store Instructions", *Journal of Computer Languages*, vol. 15, No. 2, pp. 83–94, 1990.

Knoop et al., "Partial Dead Code Elimination", *Proceedings of the ACM SIGPLAN '94 Conference on Programming Language Design and Implementation*, pp. 147–158, Jun. 1994.

REDUNDANT

FIG. 3B

PARTIALLY REDUNDANT

FIG. 4A

ORIGINAL CODE

FIG. 4B

AFTER PRE OF LOADS

FIG. 5A

BEFORE FACTORING

FIG. 5B

AFTER FACTORING

— CONTROL EDGES
---- REDUNDANCY EDGES

FIG. 6A

LOADS OF X

FIG. 6B

STORES TO X

FIG. 7A

ORIGINAL CODE

FIG. 7B

SPECULATIVE LOAD/STORE INSERTED

METHOD, SYSTEM, AND COMPUTER PROGRAM PRODUCT FOR PERFORMING REGISTER PROMOTION VIA LOAD AND STORE PLACEMENT OPTIMIZATION WITHIN AN OPTIMIZING COMPILER

CROSS-REFERENCE TO RELATED APPLICATIONS

This application is related to the following commonly-owned, applications:

"Method, System, and Computer Program Product for Using Static Single Assignment Form as a Program Representation and a Medium for Performing Global Scalar Optimization", by Chow et al., having application Ser. No. 09/097,072 TBA, filed concurrently herewith;

"Method, System, and Computer Program Product for Extending Sparse Partial Redundancy Elimination to Support Speculative Code Motion within an Optimizing Compiler" by Lo et al., having application Ser. No. 09/097,715 TBA, filed concurrently herewith;

"System, Method and Computer Program Product for Partial Redundancy Elimination Based on Static Single Assignment Form During Compilation" having application Ser. No. 08/873,895, filed Jun. 13, 1997, now allowed; and "System and Method to Efficiently Represent Aliases and Indirect Memory Operations in Static Single Assignment Form During Compilation" having application Ser. No. 08/636,605, now U.S. Pat. No. 5,768,596.

Each of the above applications are incorporated herein by reference in their entirety.

BACKGROUND OF THE INVENTION

1. Field of the Invention

The present invention relates generally to computer program (i.e., software) compilers and more particularly to optimizers in computer program compilers that perform an optimization known as partial redundancy elimination (PRE).

2. Related Art

The Static Single Assignment Form (SSA) is a popular program representation in optimizing compilers, because it provides accurate use-definition (use-def) relationships among the program variables in a concise form. SSA is described in detail in R Cytron et al., *Efficiently Computing Static Single Assignment Form and the Control Dependence Graph*, ACM Trans. on Programming Languages and Systems, 13(4):451–490, October 1991, which is incorporated herein by reference in its entirety.

The SSA form can be briefly described as a form where each definition of a variable is given a unique version, and different versions of the same variable can be regarded as different program variables. Each use of a variable version can only refer to a single reaching definition. When several definitions of a variable, $a_1, a_2, \ldots, a_m$, reach a common node (called a merging node) in the control flow graph of the program, a $\phi$ function assignment statement, $a_n=\phi(a_1, a_2, \ldots, a_m)$, is inserted to merge the variables into the definition of a new variable version $a_n$. Thus, the semantics of single reaching definitions are maintained.

Optimizations based on SSA all share the common characteristic that they do not require traditional iterative data flow analysis in their solutions. They all take advantage of the sparse representation of SSA. In a sparse form, information associated with an object is represented only at places where it changes, or when the object actually occurs in the program. Because it does not replicate information over the entire program, a sparse representation conserves memory space. Thus, information can be propagated through the sparse representation in a smaller number of steps, speeding up most algorithms.

Many efficient global optimization algorithms have been developed based on SSA. Among these optimizations are dead store elimination, constant propagation, value numbering, induction variable analysis, live range computation, and global code motion. However, partial redundancy elimination (PRE), a powerful optimization algorithm, was noticeably missing among SSA-based optimizations. PRE was first described in E. Morel and C. Renvoise, *Global Optimization by Suppression of Partial Redundancies, Comm. ACM,* 22(2):96–103, February 1979, which is incorporated herein by reference in its entirety. PRE, which has since become an important component in many global optimizers, targets partially redundant computations in a program, and removes global common sub-expressions and moves invariant computations out of loops. In other words, by performing data flow analysis on a computation, it determines where in the program to insert the computation. These insertions in turn cause partially redundant computations to become fully redundant, and therefore safe to delete.

Given the fact that PRE was not among SSA-based optimizations a method for performing SSA-based PRE of expressions, known as SSAPRE, along with a discussion of SSA and PRE was disclosed and described in detail in a commonly-owned, co-pending application entitled "System, Method, and Computer Program Product for Partial Redundancy Elimination Based on Static Single Assignment Form During Compilation" having application Ser. No. 08/873,895 (Attorney Docket No. 15-4-479.00), filed Jun. 13, 1997, now allowed incorporated herein by reference in its entirety.

SSAPRE can be briefly described as a six-step method that allows partial redundancy elimination (PRE) to be done directly on a static single assignment (SSA) representation of a computer program during compilation. SSAPRE may be considered sparse because it does not require collecting traditional local data flow attributes over the program and it does not require any form of iterative data flow analysis to arrive at its solution.

First, SSAPRE processing involves a "Φ-insertion" step that inserts Φ functions for expressions where different values of the expressions reach common points in the computer program. The result of each of the Φ functions is assigned to a hypothetical variable h.

Second, SSAPRE performs a "renaming" step where SSA versions are assigned to hypothetical variables h in the computer program. In one embodiment, the renaming step may involve a delayed renaming approach.

Third, SSAPRE further performs a "down safety" step of determining whether each Φ function in the computer program is down safe.

Fourth, SSAPRE performs a "will be available" step that accurately predicts whether each expression in the computer program will be available at each Φ function following eventual insertion of code into the computer program for purposes of partial redundancy elimination.

Fifth, SSAPRE additionally performs a "finalize" step of transforming the SSA representation of the computer program having hypothetical variables h to an SSA graph that includes some insertion information reflecting eventual insertions of code into the computer program for purposes of partial redundancy elimination.

Sixth, SSAPRE performs a "code motion" step of updating the SSA representation of the program based on the insertion information to introduce real temporary variables t for the hypothetical variables h.

SSAPRE optionally performs a "collect-occurrences" step of scanning the SSA representation of the computer program to create a work list of expressions in the computer program that need to be considered during optimization.

Despite the development of SSAPRE, there still exists room for improvements in other areas of compiler optimization. For example, register allocation is among the most important functions performed by an optimizing compiler. Prior to register allocation, it is necessary to identify the data items in the program that are candidates for register allocation. To represent register allocation candidates, compilers commonly use an unlimited number of pseudo-registers. Pseudo-registers are also called symbolic registers or virtual registers, to distinguish them from real or physical registers. Pseudo-registers have no alias, and the process of assigning them to real registers involves only renaming them. Thus, using pseudo-registers simplifies the register allocator's job.

Optimization phases generate pseudo-registers to hold the values of computations that can be reused later, like common sub-expressions and loop-invariant expressions. Variables declared, for example, with the "register" attribute in the C programming language, together with local variables determined by the compiler to have no alias, can be directly represented as pseudo-registers. All remaining register allocation candidates have to be assigned pseudo-registers through the process of register promotion.

Register promotion identifies sections of code in which it is safe to place the value of a data object in a pseudo-register. Register promotion is regarded as an optimization because instructions generated to access a data object in a register are more efficient than if it is not in a register. If later register allocation cannot find a real register to map to a pseudo-register, it can either spill the pseudo-register to memory or re-materialize it, depending on the nature of the data object.

After an earlier alias analysis, during a compilation, has already identified the points of aliasing in the program, and that these aliases are accurately characterized in the SSA representation of the program, register promotion can be performed. The register promotion phase (of a program optimization) inserts efficient code that sets up data objects in pseudo-registers, and rewrites the program code to operate on them. The pseudo-registers introduced by register promotion are maintained in valid SSA form. Targets for register promotion typically include scalar variables, indirectly accessed memory locations and program constants.

Different approaches have been used in the past to perform register promotion. In F. Chow and J. Hennesey, *The Priority-based Coloring Approach to Register Allocation, ACM Trans. on Programming Languages and Systems*, 12(4):501–536, October 1990, a use of data flow analysis to identify the live ranges where a register allocation candidate can be safely promoted was disclosed. Because global register allocation was performed relatively early, at the end of global optimization, a separate register promotion phase was not required. Instead, register promotion was integrated into the global register allocator, and profitable placement of loads and stores is performed only if a candidate is assigned to a real register. In optimizing the placement of loads and stores, a simplified and symbolic version of PRE was used that made use of the fact that the blocks that make up each live range must be contiguous.

In K. Cooper and J. Lu, *Register Promotion in C Programs*, Proceedings of the ACM SIGPLAN '97 Conference of Programming Language Design and Implementation, pp. 308–319, June 1997, an approach that is entirely loop-based was disclosed. By scanning the contents of the blocks comprising each loop, candidates that can be safely promoted to register in the full extent of the loop are identified. The load to a pseudo-register was generated at the entry to the outermost loop where the candidate was promotable. The store, if needed, was generated at the exit of the same loop. The algorithm presented handled both scalar variables and pointer-based memory accesses where the base was loop-invariant. The approach was "all-or-nothing" in the sense that if only one part of a loop contains an aliased reference, the candidate would not be promoted for the entire loop. It did not handle straight-line code, relying instead on the PRE phase to achieve the effects of promotion outside loops, but it was not clear if the algorithm's PRE phase could handle stores appropriately.

In D. Dhamdhere, *Register Assignment Using Code Placement Techniques, Journal of Computer Languages*, 15(2):83–94, 1990, the recognition that register promotion can be modeled as a problem of code placement for loads and stores, thereby benefitting from the established results of PRE, was first made. The Load-Store Insertion Algorithm (LSIA) disclosed was an adaptation of Morel and Renvoise's PRE algorithm for load and store placement optimization. LSIA solved for the placements of both loads and stores simultaneously.

As recognized by the Inventors, the PRE of stores in the context of register promotion, specifically, can be viewed as another approach to partial dead store elimination (PDE), for which numerous algorithms have also been described. In F. Chow, *A Portable Machine-independent Global Optimizer—Design and Measurements*, Technical Report 83–254 (PhD. Thesis), Computer Systems Laboratory, Stanford University, December 1983, the dual of Morel and Renvoise's PRE algorithm was applied, to the optimization of store statements. After solution of the data flow equations in bit vector form, an insertion pass identified the latest insertion point for each store statement taking into account any possible modification of the right hand side expression. In Knoop et al., *Partial Dead Code Elimination*, Proceedings of the ACM SIGPLAN '94 Conference on Programming Language Design and Implementation, pp. 147–158, June 1994, an algorithm, also PRE-based, was presented. The Knoop algorithm, however, was separated into an elimination step and a sinking step, and iterated exhaustively so as to cover second order effects. The algorithm was thus more expensive than straight PRE. To additionally cover "faint code elimination" (a store is faint if it is dead or becomes dead after some other dead stores have been deleted), a "slotwise" solution of the data flow equations was used as described in D. Dhamdhere et al., *How to Analyze Large Programs Efficiently and Informatively*, Proceedings of the ACM SIGPLAN '92 Conference of Programming Language Design and Implementation, pp. 212–223, June 1992.

The PRE-based approaches to PDE did not modify the control flow structure of the program, thus limiting the partial dead stores that may be removed. Non-PRE-based PDE algorithms may remove additional partial dead stores by modifying the control flow. In L. Fiegen et al., *The Revival Transformation*, Conference Record of the Twenty First ACM Symposium on Principles of Programing Languages, pp. 147–158, January 1994, a revival transformation was disclosed where a partially dead statement is detached from its original place in the program and reattached at a later point at which it is minimally dead. In cases where movement of a single store is not possible, the transformation moved a superstructure that included other statements and branches. However, the coverage of the revival transformation was limited because it may not be applied across loop boundaries. The algorithm as presented also did not consider situations that required multiple re-attachment points to remove a partially dead store.

A PDE approach using slicing transformations was recently proposed in R. Bodik and R. Gupta, *Partial Dead Code Elimination using Slicing Transformation,* Proceedings of the ACM SIGPLAN '97 Conference of Programming Language Design and Implementation, pp. 159–170, June 1997. Instead of moving partially dead statements, the approach of predicating them was taken. The predication embedded the partially dead statement in a control flow structure, determined through program slicing, such that the statement was executed only if the result of the statement was eventually used. A separate branch deletion phase restructures and simplifies the flow graph. Bodik and Gupta showed that for acyclic code, all partially dead statements may be eliminated. Their algorithm worked on one partially dead statement at a time. Since the size of the code may grow after the PDE of each statement, complete PDE may take exponential time, and result in massive code restructuring. The vastly different code shape can cause additional variation in program performance.

Another PDE algorithm, described in Gupta et al., *Path Profile Guided Partial Dead Code Elimination Using Predication,* Proceedings of the Fifth International Conference on Parallel Architectures and Compilation Techniques, pp. 102–112, November 1997, used predication to enable code sinking in removing partial dead stores. The technique used path profiling information to target only statements in frequently executed paths. A cost-benefit data flow analysis technique determined the profitability of sinking, taking into account the frequencies of each path considered. The same approach is used in Gupta et al., *Resource Sensitive Profile-Directed Data Flow Analysis for Code Optimization,* Proceedings of the 30th Annual International Symposium on Microarchitectures, pp. 358–368, December 1997 to speculatively hoist computations in PRE. Decisions to speculate were made locally at individual merge or split points based on the affected paths. Acyclic and cyclic code were treated by different versions of the algorithm.

What is needed is a method, system, and computer program product for deriving new efficient and flexible methods for partial redundancy elimination of many types of computations (e.g., expressions, loads, stores, assignments, and the like) and code placement directions (e.g., forward or backward). Further, what is needed is an efficient method, system, and computer program product for performing register promotion via load and store placement optimization within an optimizing compiler.

SUMMARY OF THE INVENTION

The present invention is directed to a method, system, and computer program product for performing register promotion via load and store placement optimization within an optimizing compiler. The present invention is a partial redundancy elimination (PRE) based approach to register promotion, where the PRE of loads is first applied, followed by the PRE of stores. The present invention's ordering is based on the fact that the PRE of loads is not affected by the results of the PRE of stores, but the PRE of loads creates more opportunities for the PRE of stores by deleting loads that would otherwise have blocked the movement of stores.

More particularly, the method for the present invention includes expressing a computer program in a static single assignment (SSA) form and performing static single assignment partial redundancy elimination (SSAPRE) on the SSA form to remove redundant load operations. To perform the PRE of stores, a dual of the SSAPRE algorithm called static single use partial redundancy elimination (SSUPRE) is disclosed. Internal to the SSUPRE, the SSA form is converted into a novel static single use (SSU) form. Because the PRE of stores is treated in the context of register promotion, the right hand side of the store is not taken into account. Each store statement x←<expr> is treated as if it were made up of the sequence (where x is a variable and r is a pseudo register):

(1) r←<expr>

(2) x←r

The PRE of stores is then applied purely to the store x←r. This allows greater movement of the store, because it is not blocked by any modification to <expr>, while simplifying the method of the present invention. The method enables a compiler to produce more efficient, register-promoted executable program code.

The present invention allows second order effects to be disregarded, because doing the earlier PRE of loads effectively removes most of the loads that may block the movement of stores. Before performing register promotion, a standard SSA-based dead store elimination algorithm as described in R Cytron et al., cited above, which deletes all dead or faint stores, is invoked.

Decoupling the treatments of loads and stores also allows the use of an algorithm essentially unchanged from the base PRE algorithm. The present invention's approach is SSA-based and worklist-driven. While the present invention generally cannot benefit from the parallelism inherent in bit vector operations, it compensates by doing data flow analysis on the sparse SSA representation, which takes fewer steps. Handling one candidate at a time allows easier, more intuitive and flexible implementation. When there are fewer candidates to work on, the present invention's approach will finish earlier, whereas a bit-vector-based approach always requires some material fixed cost. The present invention's approach is thus more cost-effective, because the number of candidates for register promotion in a procedure often shows wide variation.

In one preferred example of the present invention, the SSAPRE of loads utilizes an SSA program representation that encodes alias information using virtual variables as described in a commonly-owned, co-pending application entitled "System and Method to Efficiently Represent Aliases and Indirect Memory Operations in Static Single Assignment Form During Compilation" having application Ser. No. 08/636,605, now U.S. Pat. No. 5,768,596 which is incorporated herein by reference in its entirety. Thus, it is easy to perform additional context-sensitive alias analyses during SSAPRE's Rename step to expose more redundancy among loads that have potential aliases. In situations where there is a chain of aliasing stores, the present invention's sparse approach may stop after identifying the first aliasing store. In contrast, traditional bit-vector-based approaches would have to analyze the sequence completely in order to initialize the bit vectors for data flow analyses. Hence, in programs with many aliased loads and stores, SSAPRE is often faster than traditional bit-vector-based PRE.

A further advantage of using the previously-disclosed SSAPRE framework is that, given an existing implementation of SSAPRE for general expressions, only a small effort is needed to obtain coverage for the PRE of indirect loads and scalar loads.

Further features and advantages of the invention as well as the structure and operation of various embodiments of the present invention are described in detail below with reference to the accompanying drawings.

BRIEF DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

FIGS. 8A-8D are diagrams illustrating the spare PRE of stores according to an example embodiment of the present invention;

DETAILED DESCRIPTION OF THE PREFERRED EMBODIMENTS

Table of Contents

I. Overview
II. Register Promotion
III. Load Placement Optimization
IV. Store Placement Optimization
   A. Foundation of Sparse PRE
   B. Duality Between Loads and Stores
   C. SSUPRE Algorithm
      1. Insertion
      2. Rename
      3. UpSafety
      4. WillBeAnt
      5. Finalize
      6. CodeMotion
V. Benchmark Testing of the Present Invention
VI. Environment
VII. Conclusion

I. Overview

The present invention relates to a method, system, and computer program product for performing register promotion via load and store placement optimization within an optimizing compiler. Register promotion is relevant to objects that need to be memory-resident in some part of the program. Global variables are targets for register promotion because they reside in memory between procedures. Aliased variables need to reside in memory at the points of aliasing. Before register promotion, register promotion candidates can be regarded as being memory-resident throughout the program. As a result, there is a load operation associated with each of their uses, and there is a store operation associated with each assignment to them. Symbolically, for a variable x and pseudo register r, a store of the register's content to a variable is expressed as:

$$x \leftarrow r$$

and a load of the value of variable x to the register is expressed as:

$$r \leftarrow x$$

Hence, as recognized by the Inventors, register promotion can be modeled as two separate problems: (1) partial redundancy elimination of loads; followed by (2) partial redundancy elimination of stores.

For the sake of recognizing redundancy, loads behave like ordinary expressions because the later occurrences are the ones to be deleted. For stores, the reverse is true—the earlier stores are the ones to be deleted, as is evident in the examples of FIGS. 6A and 6B. The PRE of stores problem, which the inventors recognize can also be referred to as partial dead store elimination (PDE), can thus be treated as the dual of the PRE of loads problem. As used herein, the term "dual" is used in its binary arithmetic sense. That is, for a set A, there is a dual set, $\overline{A}$, which includes the converse of each element of set A.

Performing PRE of stores thus has the effects of moving stores forward while inserting them as early as possible. By combining the effects of the PRE of loads and stores, the present invention's register promotion approach results in optimal placements of loads and stores while minimizing the live ranges of the pseudo-registers.

A method for register promotion is presented herein based on the observation that the circumstances for promoting a memory location's value to a register coincide with situations where the program exhibits partial redundancy between accesses to the memory location. Thus an approach to register promotion by modeling the optimization as two separate problems: (1) the PRE of loads; and (2) the PRE of stores is presented. Both of these problems are solved through a sparse approach to PRE according to the present invention.

The recently developed SSAPRE algorithm for eliminating partial redundancy using a sparse SSA representation forms the foundation for the present invention to eliminate redundancy among memory accesses (i.e., loads), enabling both computational and live range optimality to be achieved in register promotion results. Since the PRE of loads uses the same algorithm as the PRE of expressions, it can be integrated into an existing implementation of SSAPRE with minimal effort and little impact on compilation time. This solves (1) the PRE of loads.

The PRE of stores, however, uses a different algorithm. A static single use (SSU) form is defined and the dual of the SSAPRE algorithm, called SSUPRE, is presented herein to perform the partial redundancy elimination of stores. SSUPRE is performed after the PRE of loads, taking advantage of the loads' having been converted into pseudo-register references so that there are fewer barriers to the movement of stores.

Since register promotion is relevant only to aliased variables and global variables, the number of candidates in each program unit is usually not large. Therefore a sparse, per-variable approach to the problem is justified. In contrast, a bit-vector-based approach takes advantage of the parallelism inherent in bit vector operations, but incurs some larger fixed cost in initializing and operating on the bit vectors over the entire control flow graph. As a result, the present invention's sparse approach results in very little degradation in compilation time compared to the conventional bit-vector-based implementations.

The present invention is described in terms of the above example. This is for convenience only and is not intended to limit the application of the present invention. In fact, after reading the following description, it will be apparent to one skilled in the relevant art how to implement the following invention in alternative embodiments. For example, the preferred embodiment of the present invention is directed toward register promotion, however, it may be generalized towards other optimizations. These optimization include, but are not limited to, assignment code motion, partial dead code elimination, PRE of branches, and the like. The present invention addresses the partial redundancy elimination of expressions in a forward manner. However, as illustrated herein, many other types of computations and directions may be dealt with.

Figure 1:
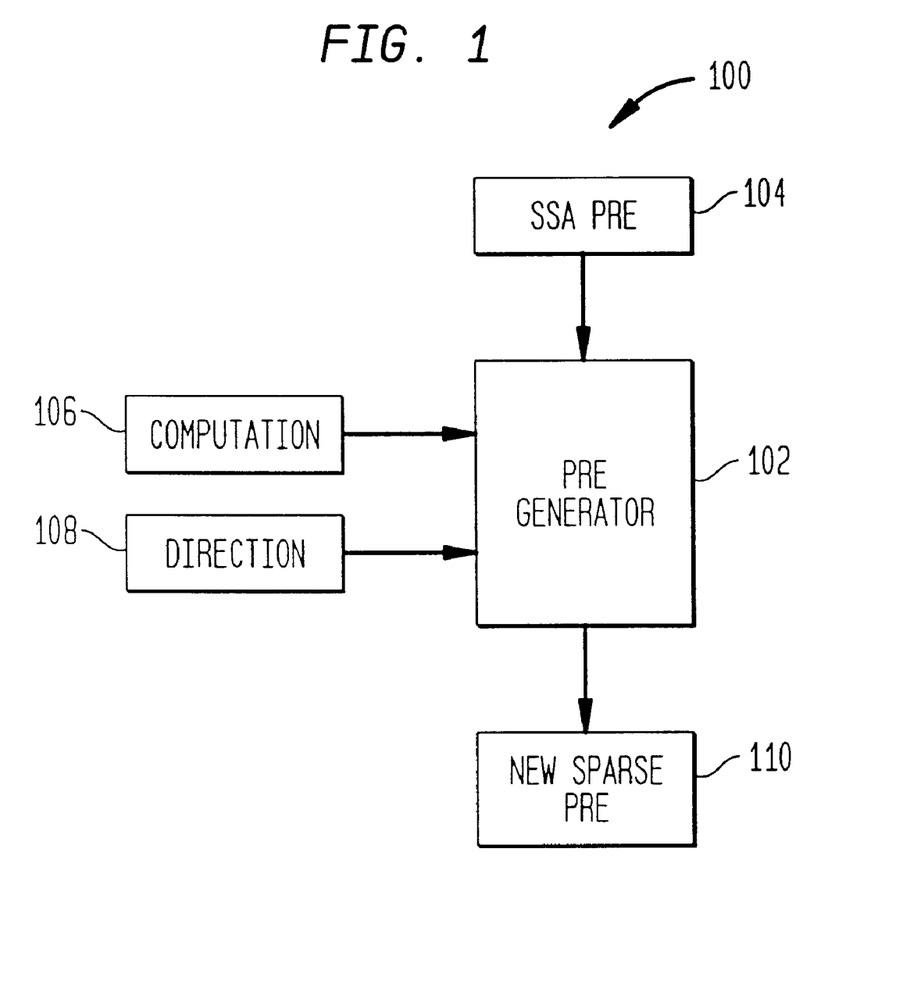
FIG. 1 is a diagram of a sparse PRE generation system according to one embodiment of the present invention.

Referring to FIG. 1, a sparse PRE generation system 100, according to an embodiment of the present invention, is shown. The sparse PRE generation system 100 centers around a PRE generator 102 which takes as inputs the previously-disclosed SSAPRE method 104, a programming language computation 106 and a direction 108. The output of the PRE generator 102 is a new sparse PRE method 110. The programming computation 106 input may be an expression, a load, a store, an assignment, or the like. The direction 108 input is either forward or backward. The PRE generator 102 alters the previously-disclosed SSAPRE algorithm by modifying the Φ-Insertion and Rename steps (steps 1 and 2) to produce a new form such as SSU, and the CodeMotion (step 6) to perform code motion in the direction specified by direction input 108. The alterations are described in detail in Section III below.

More specifically, the SSUPRE method as disclosed below is a new PRE method 110 generated by PRE generation 102 as a result of a store programming language computation 106 input and a forward direction 108 input. As will be apparent to one skilled in the relevant art(s), other new PRE methods 110 may be generated (i.e., derived) based on the different permutations of computation 106 and direction 108 inputs.

Furthermore, as mentioned above, targets for register promotion typically include scalar variables, indirectly accessed memory locations and program constants. Because program constants, however, can only be referenced but not stored into, they represent only a subset of the larger problem of register promotion for memory-resident objects. Thus, for convenience, they are not addressed herein, even though the present invention is applicable to them.

II. Register Promotion

Figure 2:
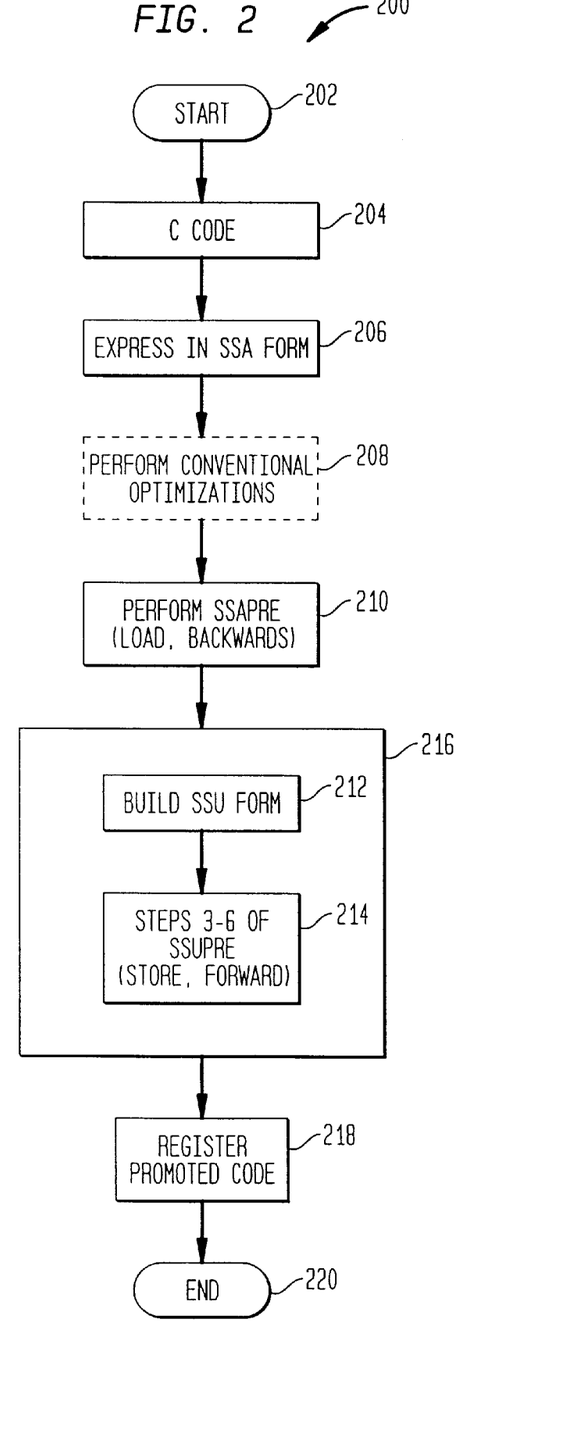
FIG. 2 is a flowchart representing an example embodiment of the present invention for performing register promotion.

Referring to FIG. 2, a register promotion method 200 according to a preferred embodiment of the present invention is shown. As suggested above, register promotion method 200, by taking advantage of the PRE generation system 100, allows the recently developed and previously-disclosed SSAPRE algorithm for eliminating partial redundancy using a sparse SSA representation to form the foundation for eliminating redundancy among loads and stores.

The register promotion method 200 begins at step 202 with control passing immediately to step 204. In step 204, an application program written in a high-level language (e.g., the C programming language) is presented to a compiler for compilation. In step 206 the C code is expressed in SSA form as will be apparent to one skilled in the relevant art(s). In step 208, the compiler performs any number of conventional optimizations (e.g., dead store elimination, constant propagation, etc.). It should be noted that step 208 is optional and does not form part of the present invention. It is presented herein, however, to place the invention in context. In step 210, the PRE of loads is performed using the SSAPRE method. The SSAPRE method is formed by PRE generation 100 (with a load computation 106 and a backward direction 108 as inputs).

In step 216, the PRE of stores is performed using the SSUPRE method of the present invention. The SSUPRE method, as mentioned above, is formed by PRE generation 100 (with a store computation 106 and a forward direction 108 as inputs). Step 216 includes a step 212 and step 214. In step 212, the SSU form of the C code is first built by the steps one and two of the SSUPRE method. In step 214, the remaining steps three to six of the SSUPRE method are performed to complete the PRE of stores. As a result of step 216, which is described further in detail below, the compiler produces register promoted (i.e., optimized) code in step 218. Register promotion 200 is thus complete as indicated by step 220.

III. Load Placement Optimization

Before register promotion 200, there is a load associated with each reference to the variable. Applying PRE to loads removes redundancy among the loads and introduces pseudo-registers to hold the values of redundant loads to be reused. Because of PRE, the number of pseudo-registers created is also reduced. The same holds for indirect load operations in the program. SSAPRE can be applied to both types of loads without much modification. As mentioned above, SSAPRE is described in detail in the commonly-owned, co-pending application entitled "System, Method, and Computer Program Product for Partial Redundancy Elimination Based on Static Single Assignment Form During Compilation" having application Ser. No. 08/873,895 (Attorney Docket No. 15-4-479.00), filed Jun. 13, 1997, now allowed. For completeness, however, a brief overview of the SSAPRE algorithm is given herein.

SSAPRE performs PRE on one program computation at a time. For a given program computation, E, SSAPRE consists of six separate steps. The first two steps, (1) Φ-Insertion and (2) Rename, construct the SSA form for the hypothetical temporary h that represents the value of E. The next two steps, (3) DownSafety and (4) WillBeAvail, perform sparse computation of global data flow attributes based on the SSA graph for h. The fifth step, (5) Finalize, determines points in the program to insert computations of E, marks computations that need to be saved and computations that are redundant, and determines the use-def relationship among SSA versions of the real temporary t that will hold the value of E. The last step, (6) CodeMotion, transforms the code to form the optimized output.

In the SSA representation utilized by the present invention, indirect loads are in the form of expression trees, while direct loads are leaves in the expression trees. SSAPRE processes the operations in an expression tree bottom-up. If two occurrences of an indirect load, *(a1+b1)

and *(a2+b2), have partial redundancy between them, the two address expressions must also (a1+b1) and (a2+b2) have partial redundancy between them. Because of the bottom-up processing order, by the time SSAPRE works on the indirect loads, the address expressions must have been converted to temporaries t1 and t2. Hence, SSAPRE only needs to handle indirect loads whose bases are (or have been converted to) leaves.

A store of the form x←<expr> can be regarded as being made up of the sequence:

(1) r←<expr>
(2) x←r

Figure 3A:
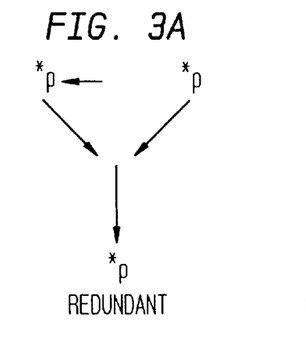
FIGS. 3A and 3B are diagrams illustrating how loads are made redundant by stores according to an example embodiment of the present invention.
Figure 3B:
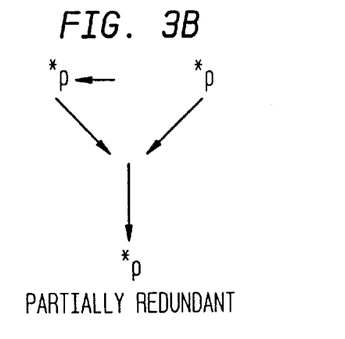

Because the pseudo-register r contains the current value of x, any subsequent occurrences of the load x can reuse the value from r, and thus can be regarded as redundant. The same observations apply to indirect stores, replacing x by *p. FIGS. 3A and 3B gives examples of loads made redundant by stores.

The implication of this store-load interaction is that the occurrences of the stores have to be take into account when the PRE of loads is performed. During PRE on the loads of x, "x ←" is called a left occurrence. The Φ-Insertion step will also insert Φ's at the iterated dominance frontiers of left occurrences. In the Rename step, a left occurrence is always given a new h-version, because a store is a definition. Any subsequent load renamed to the same h-version is redundant with respect to the store.

In the CodeMotion step, if a left occurrence is marked save, the corresponding store statement will be split into two statements:

The placement of the new store x←t$_1$ will be optimized by the PRE of stores (step 216 of FIG. 2) performed after the PRE of loads (step 210 of FIG. 2).

Figure 4A:
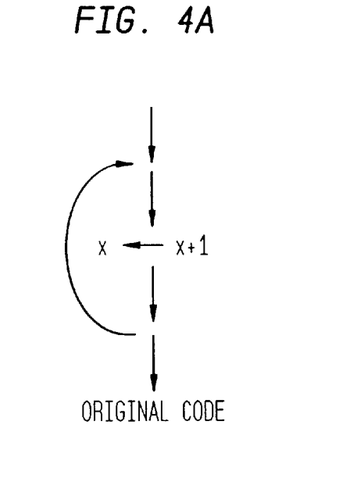
FIGS. 4A and 4B are diagrams illustrating load and store interaction according to an example embodiment of the present invention.
Figure 4B:
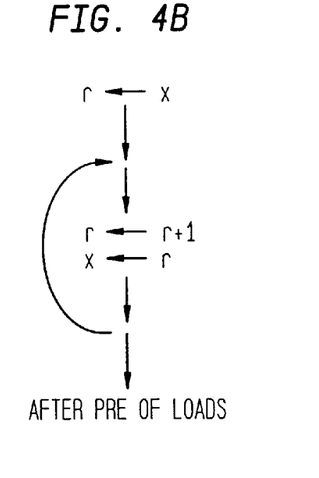

The importance of store-load interaction is illustrated by FIGS. 4A and 4B. Ordinarily, the load of x cannot be moved out of the loop because x's value is changed inside the loop. Recognizing "x ←" as a left occurrence exposes partial redundancy in the load of x. PRE in turn moves the load of x to the loop header. The store to x will be moved to the loop exit when the PRE of stores is later performed as described in Section IV below.

In performing SSAPRE for direct loads, the Φ-Insertion and Rename steps can be streamlined by taking advantage of the variable being already in SSA form. The φ's and SSA versions of the variable can be mapped to the Φ's and h-versions of its load operation.

IV. Store Placement Optimization

In this section, the method to perform PRE of stores (or PDE) is presented. However, the underlying principles behind the sparse approach to PRE is first presented. Then, the characteristics between loads and stores are related and contrasted to establish the duality between load redundancy and store redundancy. Given this duality, a dual of SSAPRE, called static single use partial redundancy elimination (SSUPRE), that performs PRE of stores is described.

A. Foundation of Sparse PRE

A hypothetical computation C, which performs an operation to yield a value, is used to explain the sparse approach to PRE. The occurrence C_1, with respect to which other occurrences are redundant, is focused upon and the assumption that there is no modification of the value computed by C_1 in the program is made. (In C_n, the n refers to an individual occurrence and not an SSA version.) Any occurrence of C in the region of the control flow graph dominated by C_1 is fully redundant with respect to C_1. An occurrence of C outside this region may be partially redundant with respect to C_1. The earliest possible strictly partially redundant occurrences of C with respect to C_1 are in the dominance frontier of C_1. Dominance frontiers are also the places where Φ operators are required in minimal SSA form, as described in Cytron et al. cited above, intuitively indicating that there are common threads between PRE and properties of SSA form.

The present invention's sparse approach to PRE, as exemplified by SSAPRE, relies on a representation that can directly expose partial redundancy. Such a representation can be derived as follows: if an occurrence C_2 is partially redundant with respect to C_1, this redundancy is represented by a directed edge from C_2 to C_1.

Figure 5A:
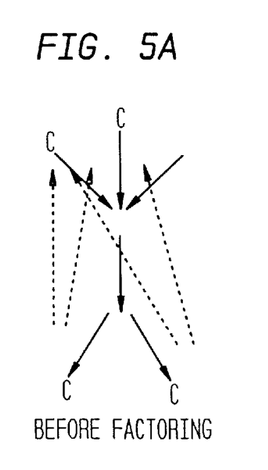
FIGS. 5A and 5B are diagrams illustrating the factoring of redundancy edges according to an example embodiment of the present invention.
Figure 5B:
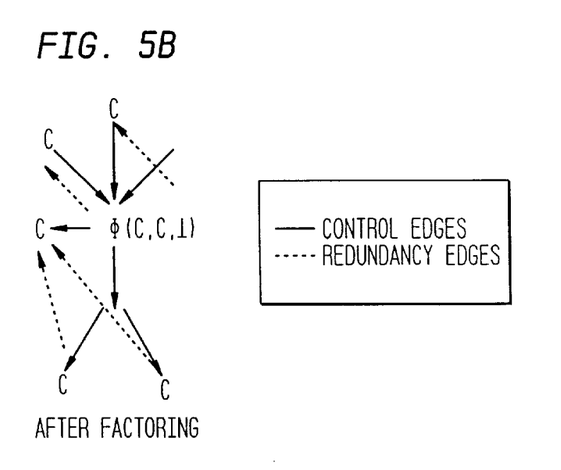

In general, if the computation C occurs many times throughout the program, there will be many of such edges. The relation represented by these edges is many-to-many, because an occurrence can be redundant with respect to multiple occurrences. These redundancy edges are factored by introducing a Φ operator at control flow merge points in the program. The effect of this factoring is to remove the many-to-many relationships, and convert them to many-to-one so that each occurrence can only be redundant with respect to a single occurrence, which may be a Φ occurrence. In the factored form, each edge represents full redundancy because the head of each edge must dominate the tail of the edge after the factoring. Strict partial redundancy is exposed whenever there is a missing incoming edge to a Φ (i.e., a ⊥ Φ operand as shown in FIG. 5).

Having identified this sparse graph representation that can expose partial redundancy, a method is needed to build the representation. A sparse graph representation of the program results from the Φ-Insertion and Rename steps of the previously-disclosed SSAPRE algorithm. Because the representation shares many of the characteristics of SSA form, the method to build this sparse graph closely parallels the standard SSA construction technique. The Φ-Insertion step inserts Φ's at the iterated dominance frontiers of each computation to serve as anchor points for placement analysis. In the Rename step, SSA versions are assigned to occurrences according to the values they compute. The resulting SSA versions encode the redundancy edges of the sparse graph as follows: if an occurrence has the same SSA version as an earlier occurrence, it is redundant with respect to that earlier occurrence.

In the present invention's sparse approach to PRE, the next two steps, DownSafety and WillBeAvail, perform data flow analysis on the sparse graph. The results enable the next step, Finalize, to pinpoint the locations in the program to insert the computation. These insertions make partially redundant occurrences become fully redundant, which are marked. At this point, the form of the optimized output has been determined. The final step, CodeMotion, transforms the code to form the optimized program.

B. Duality Between Loads and Stores

For register promotion, a unique pseudo-register r is assigned for each memory location involved in load and store placement optimization. For indirect loads and stores, a unique pseudo-register is assigned for each lexically identical address expression. The discussion in this section applies to both direct and indirect loads and stores, however, direct loads and stores are used herein as examples.

A load of the form r←x is fully redundant if the load is fully available. Likewise, a load of the form r←x is partially redundant if the load is partially available. Thus, given two occurrences of the loads, the later occurrence is the redundant occurrence. On the other hand, a store, of the form x←r, is fully redundant if the store is fully anticipated. Likewise, a store, of the form x←r, is partially redundant if the store is partially anticipated.

Figure 6A:
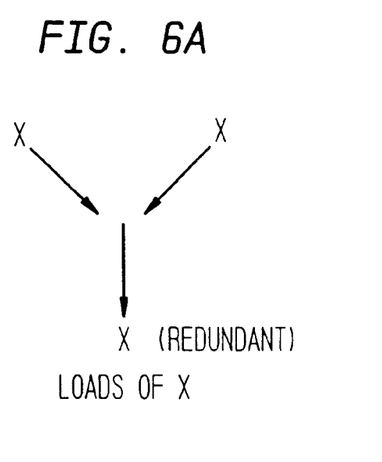
FIGS. 6A and 6B are diagrams illustrating the duality between load and store redundancies according to an example embodiment of the present invention.
Figure 6B:
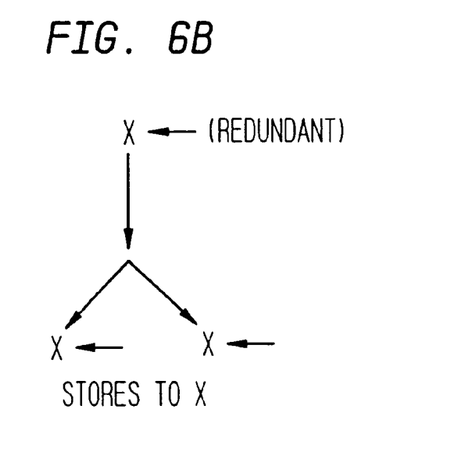

Given two occurrences of the stores, the earlier occurrence is the redundant occurrence (as illustrated in FIG. 6). As a result, redundancy edges for loads point backwards with respect to the control flow, while redundancy edges for stores point forward. The availability and anticipation of a load is killed when the memory location is modified. On the other hand, the availability and anticipation of a store is killed when the memory location is used and the movement of an available store is blocked additionally by an aliased store.

A load of x is fully redundant with respect to an earlier load of x only if the earlier load occurs at a place that dominates the current load, because this situation implies the earlier load must be executed before control flow reaches the current load. Since redundancy edges are factored across control flow merge points, the targets of the new edges always dominate their sources. All the edges now represent full load redundancies, and partial load redundancies are exposed when there are ⊥ operands in the factoring operator Φ.

A store to x is fully redundant with respect to a later store to x only if the later store occurs at a place that post-dominates the current store, because this implies the later store must eventually be executed after the current store. Since redundancy edges are factored across control flow split points, the targets of the new edges always post-dominates their sources. All the edges now represent full store redundancies, and partial store redundancies are exposed when there are Φ operands in the factoring operator Λ. In performing PRE, loads are moved backward with respect to the control flow and inserted as late as possible to minimize r's lifetime. For stores, however, they are moved forward and inserted as early as possible to minimize r's lifetime.

The present invention defines a static single use (SSU) form to be the dual of SSA form. In SSU form each use of a variable establishes a new version (i.e., the load uses the version), and every store reaches exactly one load. Just as the SSA factoring operator Φ is regarded as a definition of the corresponding variable and always defines a new version, the SSU factoring operator Λ is regarded as a use of its variable and always establishes (uses) a new version. Each use post-dominates all the stores of its version. Just as SSA form serves as the framework for the SSAPRE algorithm, SSU form serves as the framework for the present invention's method for eliminating partial redundancy among stores, which is referred to as SSUPRE. As a convention, SSU versions are annotated using superscripts (because, as is well-known in the relevant art, SSA versions are annotated using subscripts).

Table 1 summarizes the above discussion on the duality between load and store redundancies.

TABLE 1

Duality Between Load and Store Redundancies

| CHARACTERISTIC | LOAD: R ← X | STORE: X ← R |
| --- | --- | --- |
| When Redundant? | Available | Anticipated |
| Which Redundant? | Later Occurrence | Earlier Occurrence |

TABLE 1-continued

Duality Between Load and Store Redundancies

| CHARACTERISTIC | LOAD: R ← X | STORE: X ← R |
| --- | --- | --- |
| Direction of Edge | Backward | Forward |
| What Kills? | Store | Load |
| What Blocks Motion? | Store | Load, Aliased Store |
| Fully Redundant if | Dominated | Post-dominated |
| Where to Factor? | Merge Points | Split Points |
| Factoring Operation | h3 ← Φ (h1, h2) | Λ (h2, h3) ← h1 |
| Movement in PRE | Backward | Forward |
| Minimize r's Lifetime | Late Insertion | Early Insertion |

C. SSUPRE Algorithm

Having established the duality between load and store redundancies, the present invention's method for a sparse approach to the PRE of stores (i.e., PDE) (step 216 of register promotion 200) may be presented. For a general store statement, of the form x←<expr>, the present invention views it as if it were made up of the following two-part sequence:

(1) r←<expr>
(2) x←r

Figure 7A:
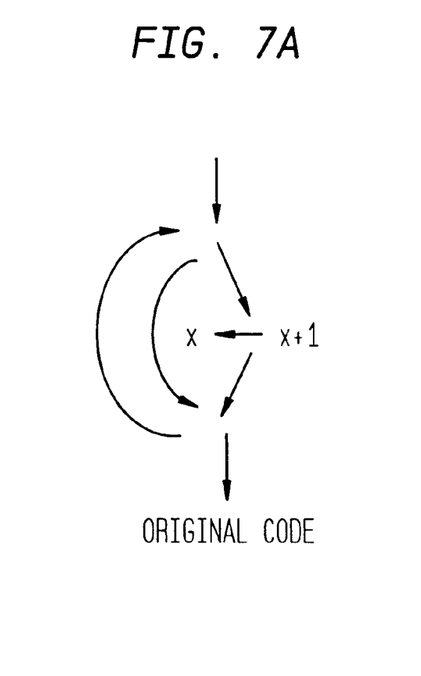
FIGS. 7A and 7B are diagrams illustrating the speculative insertion of a load and store according to an example embodiment of the present invention.
Figure 7B:
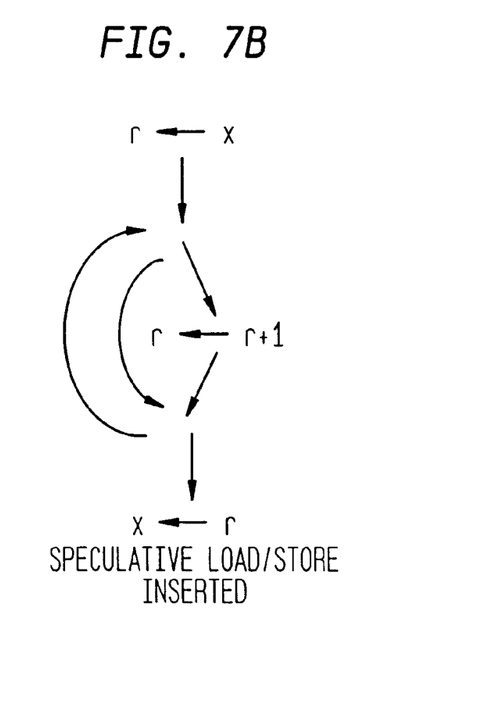

PRE is only applied to the store x←r, where x is a direct or indirect store and r is a pseudo-register. For maximum effectiveness, the PRE of stores should be performed after the PRE of loads, because the PRE of loads will convert many loads into register references so they would not block the movement of the stores (as shown in FIGS. 7A and 7B).

The present invention's SSUPRE algorithm for the PRE of stores is transcribed and dualized from the SSAPRE algorithm, except that it cannot exploit the SSA representation of the input in the same way as SSAPRE. As a result, it may be less efficient than SSAPRE on a program represented in SSA form. To achieve the same efficiency as SSAPRE, the input program would have to be represented in SSU form. Such a representation of the input is not practical because it would benefit only this particular optimization, so SSUPRE constructs (internally) the required parts of SSU form on demand.

Like SSAPRE, SSUPRE is made up of six steps, and is applicable to both direct and indirect stores. It works by constructing the graph of factored redundancy edges of the stores being optimized, called the SSU graph. The first two steps, Λ-Insertion and Rename, work on all stores in the program at the same time while conducting a pass through the entire program. The remaining steps may be applied to each store placement optimization candidate one at a time.

1. The Λ-Insertion Step

Figure 8:
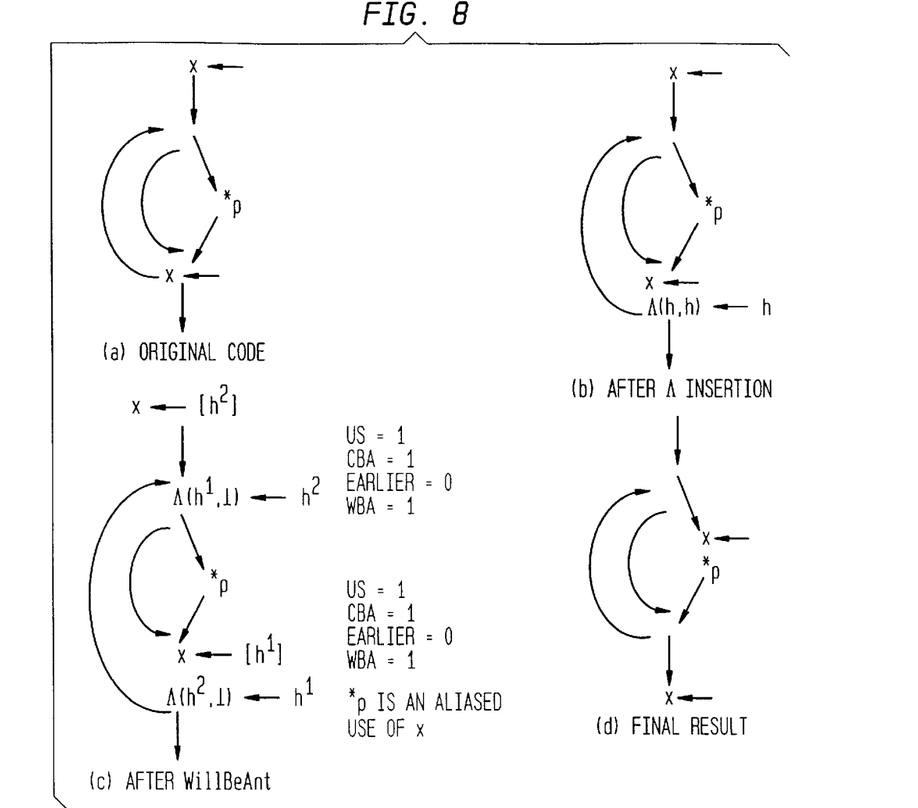

The purpose of Λ is to expose the potential insertion points for the store being optimized. There are two different scenarios for Λ's to be placed. First, Λ's have to be placed at the iterated post-dominance frontiers of each store in the program. Second, Λ's also have to be placed when a killed store reaches a split point. Because stores are killed by loads, Λ's have to be placed at the iterated post-dominance frontiers of each load (including aliased load) of the memory location. In FIG. 8b, the Λ at the bottom of the loop body is inserted due to its being a post-dominance frontier of "x ←" inside the loop, and the Λ at the split in the loop body is inserted due to it being a post-dominance frontier of the use of x in one branch of the split. Λ insertion is performed in one pass through the entire program for all stores that are PRE candidates.

2. The Rename Step

The rename step assigns SSU versions to all the stores. Each use is assigned a new SSU version, which is applied to the stores that reach it. Each Λ is assigned a new SSU version because each Λ is regarded as a use. The result of renaming is such that any control flow path that includes two different versions must cross an (aliased) use of the memory location or a Λ.

Renaming is performed by conducting a pre-order traversal of the post-dominator tree, beginning at the exit points of the program. A renaming stack is maintained for every store that is optimized. When an aliased load (use) or Λ is encountered, a new SSU version is generated and pushed it onto the stack. When a store is encountered, it is assigned the SSU version at the top of its stack and also pushed onto the stack. Entries on the stacks are popped as the blocks containing the uses that generate them are traversed upward. The operands of Λ's are renamed at the entries of their corresponding successor blocks. The operand is assigned the SSU version at the top of its stack, if the top of its stack is a store or a Λ. Otherwise, it is assigned ⊥.

To recognize that local variables are dead at exits, it is assumed that there is a virtual store to each local variable at each exit of the program unit. Since these virtual stores are first occurrences in the pre-order traversal of the post-dominator tree, they are assigned unique SSU versions. Any stores further down in the post-dominator tree that are assigned the same SSU versions are redundant and thus, deleted.

3. The UpSafety Step

One criterion required for PRE to insert a store is that the store be up-safe (i.e., available) at the point of insertion. The present step computes up-safety for the Λ's by forward propagation along the edges of the SSU graph. A Λ is up-safe if, in each backward control flow path leading to the procedure entry, another store is encountered before reaching the procedure entry, an aliased load or an aliased store. The propagation algorithm is an exact transposition of the DownSafety algorithm in SSAPRE.

Figure 9:
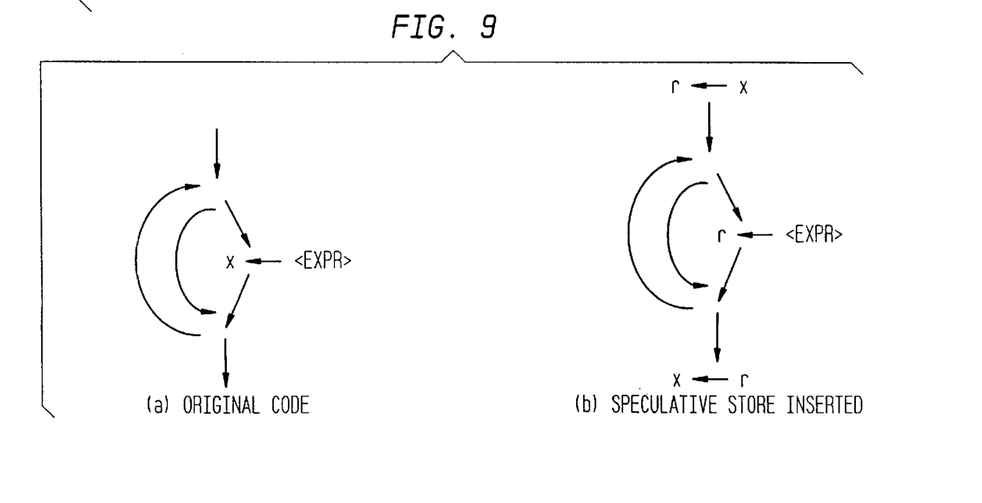
FIGS. 9A and 9B are diagrams illustrating the speculative insertion of a store according to an example embodiment of the present invention.

Two strategies for further performing speculative store placement (and speculative code motion in general) are presented and described in detail in a commonly-owned, co-pending application filed concurrently herewith entitled "Method, System, and Computer Program Product for Performing Register Promotion via Load and Store Placement Optimization within an Optimizing Compiler" having application Ser. No. 09/097,715 TBA (Attorney Docket No. 15-4-721.00), which is incorporated by reference herein in its entirety. FIGS. 9A and 9B show an example where a store is speculatively moved out of the loop.

4. The WillBeAnt Step

The WillBeAnt step predicts whether the store will be anticipated at each Λ following insertions for PRE. The method for accomplishing this again is an exact transposition of the WillBeAvail step in SSAPRE. It includes of two backward propagation passes performed sequentially. The first pass computes the can_be_ant predicate for each Λ. The second pass works within the region of can_be_ant Λ's and compute "earlier". A false value of earlier implies that the insertion of store cannot be hoisted earlier without introducing unnecessary store redundancy. At the end of the second pass, will_be_ant for a Λ is given by:

will_be_ant=can_be_ant Λ ¬ earlier

FIG. 8C shows the values of up_safe (us), can_be_ant (cba), earlier and will_be_ant (wba) for the example at each Λ. The predicate insert indicates whether insertion at a Λ operand will be performed. The insert holds for a Λ operand if and only if the following are true: (1) the Λ satisfies will_be_ant; and (2) the operand is ⊥ or has_ real_def is false for the operand and the operand is used by a Λ that does not satisfy will_be_ant (i.e., the store is not anticipated at the Λ operand).

5. The Finalize Step

The Finalize step in SSUPRE is simpler than the corresponding step in SSAPRE because placement optimization of stores does not require the introduction of temporaries. This step only identifies the stores that will be fully redundant after taking into account the insertions that will be performed. This is done in a pre-order traversal of the post-dominator tree of the program. Renaming stacks are not required because SSU versions have already been assigned. For each store being optimized, an array Ant_use (compare to Avail_def in SSAPRE) indexed by SSU version is updated and used to identify stores that are fully redundant.

6. The CodeMotion Step

This last step performs the insertion and deletion of stores to reflect the results of the store placement optimization. The stores inserted always use the pseudo-register as their right hand side, and are of either of the following forms depending on whether the store is direct or indirect:

(1) x←r; or (2) *p←r

It is necessary to make sure that the value of the pseudo-register r is current at the inserted store. This implies that the definitions of r must be checked to ensure they track the definitions of the redundant stores. To do this, the use-def edges in SSA form are followed to get to all the definitions of x that reach the point of store insertion. If the right hand side of a definition is r, the store is simply deleted. (The right hand side is a pseudo-register if the store was a left occurrence that effected redundancy elimination in the load placement phase.) If the right hand side is not r, it is changed to r, thereby removing the store, which must have been marked redundant by the Finalize step:

x←<expr>⇒r←<expr>

In cases where the inserted store is speculative, it may be necessary to insert a load on the path where the store is not available, so that the pseudo-register will have the right value at the inserted store. In the example of FIGS. 9A and 9B, the load r←x is inserted at the head of the loop for this reason.

One of the present invention's requirements is that the program be maintained in valid SSA form. This implies introducing φ's at iterated dominance frontiers and assigning the correct SSA versions for r and x. (In the case of indirect stores, the virtual variables have to be maintained in correct SSA versions.) The current version for r may easily be found by following the use-def edges of x. For x, a new SSA version is assigned in each store inserted. Uses of x reached by this inserted store in turn need to be updated to the new version, and may be conveniently handled if def-use chains are also maintained. Instead of maintaining def-use chains, however, it is more expedient to perform this task for all affected variables by adding a post-pass to SSUPRE. The post-pass is essentially the renaming step in the SSA construction algorithm, except that rename stacks only need to be maintained for the affected variables.

V. Benchmark Testing of the Present Invention

Benchmark testing of register promotion method 200, implemented in a commercial compiler such as the MIPSpro™ compiler (Release 7.2) available from Silicon Graphics, Inc. of Mountain View, Calif., was performed. More particularly, compiling the SPECint95 benchmark suite and measuring the resulting dynamic load and store counts when the benchmarks are executed using the training input data was done to evaluate the present invention.

The SPECint 95 benchmark, which is well-known in the relevant art(s), is developed by the non-profit Standard Performance Evaluation Corporation (SPEC) of Manassas, Va. and derives from the results of a set of integer benchmarks (i.e., the geometric mean of the execution times of eight standard programs).

The benchmarks were compiled at an —O2 optimization level with no in-lining. Only intra-procedural alias analysis was applied. The measurement data are gathered by simulating the compiled program after register promotion, but before code generation and register allocation. In the simulation, each access to a pseudo-register is not counted as a load or store. This is equivalent to assuming that the underlying machine has an infinite number of registers. The assumption allows us to measure the effects of register promotion without confounding effects such as spilling performed by the register allocator.

This enables the measurement of the overall effectiveness of the SSAPRE and SSUPRE approaches in removing scalar and indirect loads and stores in the programs. Because the present invention's register promotion method 200 includes the PRE of loads and the PRE of stores, test data for loads and stores were compiled separately. In experiments, the number of loads/stores executed in the benchmark programs if register promotion is turned off were compared to the number of executed loads and stores when the PRE of loads and the PRE of stores were enabled. The former data, even though register promotion is disabled, represents quite respectable code quality. This is because non-aliased local variables and compiler-generated temporaries are still assigned pseudo-registers by other parts of the compiler.

Results indicate that the PRE of loads reduces the dynamic load counts by an average of 25.6%. The PRE of stores is able to reduce the dynamic store counts by an average of 1.2%. There are a number of reasons for this contrast. First, earlier optimization phases have applied the SSA-based dead store elimination algorithm, as described in Cytron et al. cited above, which efficiently removes all faint and dead stores. Thus, the only opportunities left are those exposed by the removal of loads or those due to strictly partial store redundancy. The side effect of earlier loop normalization also moves invariant stores to the end of loop. Second, for aliased variables, there are usually aliased uses around aliased stores, and these uses block movement of the stores. Third, apart from aliased local variables, the other candidates for the PRE of stores are global variables, which tend to exhibit few store redundancies. The present invention's PRE of stores is performed after the PRE of loads. If the PRE of stores is performed when the PRE of loads is turned off, experiments revealed no advantage in the dynamic store counts, indicating that removing loads is crucial to the removal of stores.

The above description of the benchmark testing in simulations of register promotion method 200 is illustrative only and not intended to limit the present invention.

VI. Environment

Figure 10:
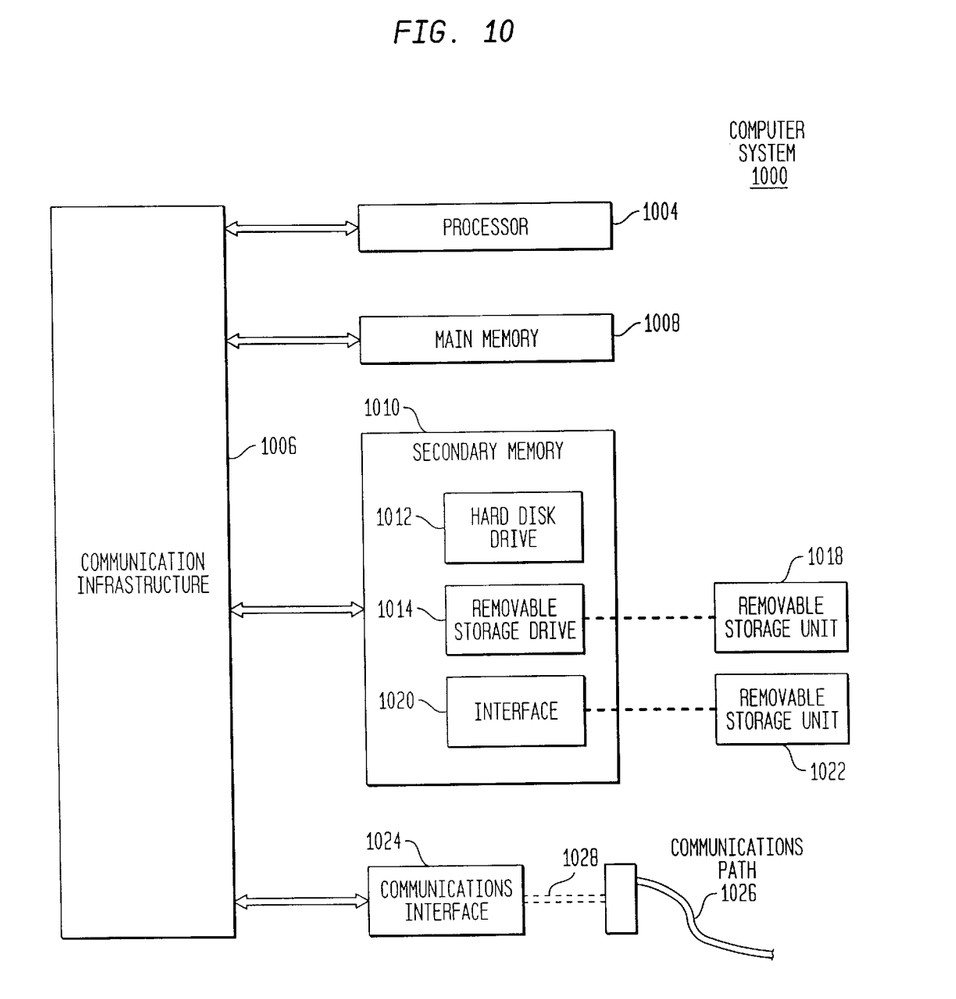
FIG. 10 is a block diagram of an example computer system for implementing the present invention.

In general, the present invention may be implemented in any compiler running on any machine, including but not limited to the MIPSpro compiler running on an machine with a MIPS R10000 microprocessor. The present invention (i.e., register promotion 200) may be implemented using hardware, software or a combination thereof and may be implemented in a computer system or other processing system. In fact, in one embodiment, the invention is directed toward one or more computer systems capable of carrying out the functionality described herein. An example of a computer system 1000 is shown in FIG. 10. The computer system 1000 represents any single or multiprocessor computer. The computer system 1000 includes one or more processors, such as processor 1004. The processor 1004 is connected to a communication infrastructure 1006 (e.g., a communications bus or network). Various software embodiments are described in terms of this exemplary computer system. After reading this description, it will become apparent to a person skilled in the relevant art how to implement the invention using other computer systems and/or computer architectures.

Computer system 1000 also includes a main memory 1008, preferably random access memory (RAM), and may also include a secondary memory 1010. The secondary memory 1010 may include, for example, a hard disk drive 1012 and/or a removable storage drive 1014, representing a floppy disk drive, a magnetic tape drive, an optical disk drive, etc. The removable storage drive 1014 reads from and/or writes to a removable storage unit 1018 in a well known manner. Removable storage unit 1018, represents a floppy disk, magnetic tape, optical disk, etc. which is read by and written to by removable storage drive 1014. As will be appreciated, the removable storage unit 1018 includes a computer usable storage medium having stored therein computer software and/or data.

In alternative embodiments, secondary memory 1010 may include other similar means for allowing computer programs or other instructions to be loaded into computer system 1000. Such means may include, for example, a removable storage unit 1022 and an interface 1020. Examples of such may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1000.

Computer system 1000 may also include a communications interface 1024. Communications interface 1024 allows software and data to be transferred between computer system 1000 and external devices. Examples of communications interface 1024 may include a modem, a network interface (such as an Ethernet card), a communications port, a PCMCIA slot and card, etc. Software and data transferred via communications interface 1024 are in the form of signals 1028 which may be electronic, electromagnetic, optical or other signals capable of being received by communications interface 1024. These signals 1028 are provided to communications interface 1024 via a communications path (i.e., channel) 1026. This channel 1026 carries signals 1028 and may be implemented using wire or cable, fiber optics, a phone line, a cellular phone link, an RF link and other communications channels.

In this document, the terms "computer program medium" and "computer usable medium" are used to generally refer to media such as removable storage drive 1014, a hard disk installed in hard disk drive 1012, and signals 1028. These computer program products (e.g., memory, media, disks, etc.) are means for providing software to computer system 1000. The invention is directed to such computer program products.

Computer programs (also called computer control logic) are stored in main memory 1008 and/or secondary memory 1010. Computer programs may also be received via communications interface 1024. Such computer programs, when executed, enable the computer system 1000 to perform the features of the present invention as discussed herein. In particular, the computer programs, when executed, enable the processor 1004 to perform the features of the present invention. Accordingly, such computer programs represent controllers of the computer system 1000.

In an embodiment where the invention is implemented using software, the software may be stored in a computer program product and loaded into computer system 1000 using removable storage drive 1014, hard drive 1012 or communications interface 1024. The control logic (software), when executed by the processor 1004, causes the processor 1004 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

VII. Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A method for performing register promotion, that optimizes placement of load and store operations of a computer program, within a compiler, comprising the steps of:

(1) accessing a static single assignment (SSA) representation of the computer program;

(2) performing static single assignment partial redundancy elimination (SSAPRE) on said SSA representation to remove at least one redundant load operation, comprising the steps of:

(a) inserting Φ functions at iterated post-dominance frontiers of loads and their left occurrences, where different values of said loads assigned values of left occurrences reach common points in the computer program, a result of each of said Φ functions being stored in a hypothetical variable h;

(b) assigning an SSA version to each said hypothetical variable h in the computer program;

(c) determining whether each of said Φ functions in the computer program is down safe;

(d) determining whether each of said loads or their assigned values will be available at each of said Φ functions following eventual insertion of code into the computer program for purposes of partial redundancy elimination;

(e) transforming said SSA representation of the computer program having said hypothetical variables h to an SSA graph that includes some insertion information reflecting eventual insertions of code into the computer program for purposes of partial redundancy elimination; and (f) updating said SSA graph based on said insertion information to introduce real temporary variables t for each of said hypothetical variables h;

thereby obtaining a first optimized SSA representation; and (3) performing static single use partial redundancy elimination (SSUPRE) on said first optimized SSA representation, said SSUPRE internally using a single static use (SSU) representation to remove at least one redundant store operation, thereby obtaining a second optimized SSA representation;

whereby the compiler can produce more efficient, register-promoted executable program code from said second optimized SSA representation.

2. The method of claim 1, wherein step (3) comprises the step of:

processing said SSA representation of the computer program to eliminate partially redundant stores, wherein said processing comprises the steps of:

(a) inserting Λ functions at iterated post-dominance frontiers of each store and iterated post-dominance frontiers of each load, the use of each of said Λ functions being represented by a hypothetical variable h; and (b) assigning a SSU version to each said hypothetical variable h in the computer program;

whereby a SSU representation of the computer program is obtained.

3. The method of claim 2, wherein step (3) further comprises the steps of:

(c) determining whether each of said Λ functions in the computer program is up safe;

(d) determining whether each of said stores will be anticipated at each of said Λ functions following eventual insertion of code into the computer program for purposes of partial redundancy elimination;

(e) identifying, through traversal in a pre-order walk of the computer program's post-dominator tree of said SSU representation, the stores that will be fully redundant following eventual insertions of code into the computer program for purposes of partial redundancy elimination; and (f) updating said SSU representation based on said insertion information to insert and delete stores for said hypothetical variables h.

4. A method for representing a computer program within a compiler in a static single use (SSU) representation, comprising the steps of:

(1) accessing a static single assignment (SSA) representation of the computer program;

(2) inserting Λ functions in said SSA representation at iterated post-dominance frontiers of each store and iterated post-dominance frontiers of each load, the use of each of said Λ functions being represented by a hypothetical variable h; and (3) assigning a SSU version to each of said hypothetical variable h in the computer program;

whereby the SSU representation allows the compiler to eliminate partial redundancy among stores within the computer program.

5. A computer program product comprising a computer usable medium having computer readable program code means embodied in said medium for causing an application program to execute on a computer that optimizes placement of load and store operations of a computer program, within a compiler, said computer readable program code means comprising:

a first computer readable program code means for causing the computer to access a static single assignment (SSA) representation of the computer program;

a second computer readable program code means for causing the computer to perform static single assignment partial redundancy elimination (SSAPRE) on said SSA representation to remove at least one redundant load operation, comprising:

a third computer readable program code means for causing the computer to process said SSA representation of the computer program to eliminate partially redundant loads, wherein said third computer readable program code means comprises:

a fourth computer readable program code means for causing the computer to insert $\Phi$ functions at iterated post-dominance frontiers of loads and their left occurrences, where different values of said loads assigned values of left occurrences reach common points in the computer program, a result of each of said $\Phi$ functions being stored in a hypothetical variable h;

a fifth computer readable program code means for causing the computer to assign an SSA version to each said hypothetical variable h in the computer program;

a sixth computer readable program code means for causing the computer to determine whether each of said $\Phi$ functions in the computer program is down safe;

a seventh computer readable program code means for causing the computer to determine whether each of said loads or their assigned values will be available at each of said $\Phi$ functions following eventual insertion of code into the computer program for purposes of partial redundancy elimination;

an eighth computer readable program code means for causing the computer to transform said SSA representation of the computer program having said hypothetical variables h to an SSA graph that includes some insertion information reflecting eventual insertions of code into the computer program for purposes of partial redundancy elimination; and a ninth computer readable program code means for causing the computer to update said SSA graph based on said insertion information to introduce real temporary variables t for each of said hypothetical variables h;

thereby obtaining a first optimized SSA representation; and a tenth computer readable program code means for causing the computer to perform static single use partial redundancy elimination (SSUPRE) on said first optimized SSA representation, said SSUPRE internally using a single static use (SSU) representation to remove at least one redundant store operation, thereby obtaining a second optimized SSA representation;

wherein the compiler produces more efficient, register-promoted executable program code from said second optimized SSA representation.

6. The computer program product of claim 5, wherein said third computer readable program code means comprises:

an eleventh computer readable program code means for causing the computer to process said SSA representation of the computer program to eliminate partially redundant stores, wherein said eleventh computer readable program code means comprises:

a twelfth computer readable program code means for causing the computer to inserting $\Lambda$ functions at iterated post-dominance frontiers of each store and iterated post-dominance frontiers of each load, the use of each of said $\Lambda$ functions being represented by a hypothetical variable h; and a thirteenth computer readable program code means for causing the computer to assigning a SSU version to each of said hypothetical variable h in the computer program;

whereby a SSU representation of the computer program is obtained.

7. The computer program product of claim 6, wherein said third computer readable program code means further comprises:

a fourteenth computer readable program code means for causing the computer to determine whether each of said $\Lambda$ functions in the computer program is up safe;

a fifteenth computer readable program code means for causing the computer to determine whether each of said stores will be anticipated at each of said $\Lambda$ functions following eventual insertion of code into the computer program for purposes of partial redundancy elimination;

a sixteenth computer readable program code means for causing the computer to identify, through traversal in a pre-order walk of the computer program's post-dominator tree of said SSU representation, the stores that will be fully redundant following eventual insertions of code into the computer program for purposes of partial redundancy elimination; and a seventeenth computer readable program code means for causing the computer to update said SSU representation based on said insertion information to insert and delete stores for said hypothetical variables h.

8. A computer program product comprising a computer usable medium having computer readable program code means embodied in said medium for causing an application program to execute on a computer that represents a computer program within a compiler in a static single use (SSU) representation, said computer readable program code means comprising:

a first computer readable program code means for causing the computer to access a static single assignment (SSA) representation of the computer program;

a second computer readable program code means for causing the computer to insert $\Lambda$ functions in said SSA representation at iterated post-dominance frontiers of each store and iterated post-dominance frontiers of each load, the use of each of said $\Lambda$ functions being represented by a hypothetical variable h; and a third computer readable program code means for causing the computer to assign a SSU version to each of said hypothetical variable h in the computer program;

whereby the SSU representation allows the compiler to eliminate partial redundancy among stores within the computer program.

* * * * *